United States Patent
Cairns et al.

(10) Patent No.: US 6,952,244 B2
(45) Date of Patent: Oct. 4, 2005

(54) ACTIVE MATRIX DEVICE AND DISPLAY

(75) Inventors: Graham Andrew Cairns, Oxford (GB); Catherine Rosinda Marie Armida Dachs, Oxon (GB); Michael James Brownlow, Oxford (GB); Yasuyoshi Kaise, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 114 days.

(21) Appl. No.: 10/081,917

(22) Filed: Feb. 20, 2002

(65) Prior Publication Data

US 2002/0154253 A1 Oct. 24, 2002

(30) Foreign Application Priority Data

Feb. 27, 2001 (GB) .............................................. 0104786

(51) Int. Cl.[7] ...................... G02F 1/136; H01L 29/04; H01L 31/036; H01L 31/0376; H01L 31/20
(52) U.S. Cl. .......................................... 349/43; 257/59
(58) Field of Search ............................ 349/43; 257/59

(56) References Cited

U.S. PATENT DOCUMENTS

| | | | | |
|---|---|---|---|---|
| 5,362,982 A | * | 11/1994 | Hirase et al. ............... | 257/408 |
| 5,517,150 A | | 5/1996 | Okumura ..................... | 327/427 |
| 5,550,760 A | * | 8/1996 | Razdan et al. ................ | 703/14 |
| 5,576,857 A | | 11/1996 | Takemura | |
| 5,618,743 A | * | 4/1997 | Williams et al. ............ | 438/276 |
| 5,650,636 A | * | 7/1997 | Takemura et al. ............ | 257/59 |
| 5,764,329 A | * | 6/1998 | Chen et al. ................. | 349/193 |
| 5,790,063 A | * | 8/1998 | Koifman et al. ............. | 341/155 |
| 5,835,170 A | | 11/1998 | Fujiwara et al. ............... | 349/38 |
| 5,936,686 A | | 8/1999 | Okumura et al. | |
| 6,023,074 A | * | 2/2000 | Zhang ........................... | 257/59 |
| 6,252,566 B1 | * | 6/2001 | Maurice ....................... | 345/55 |
| 6,271,543 B1 | * | 8/2001 | Ohtani et al. .................. | 257/72 |
| 6,492,676 B2 | * | 12/2002 | Kusunoki .................... | 257/316 |
| 6,495,858 B1 | * | 12/2002 | Zhang ........................... | 257/59 |

FOREIGN PATENT DOCUMENTS

| | | |
|---|---|---|
| EP | 0 375 233 | 12/1989 |
| EP | 0 465 111 | 6/1991 |
| EP | 631 271 A1 | 6/1994 |
| JP | 2000-314900 | 11/2000 |

OTHER PUBLICATIONS

European Search Report dated Jun. 25, 2002 for corresponding EP application No. 02251249.5–2205.
Chinese Office Action dated Nov. 28, 2003 for corresponding Chinese patent application.

* cited by examiner

Primary Examiner—Dung T. Nguyen
Assistant Examiner—Jeanne Andrea Di Grazio
(74) Attorney, Agent, or Firm—Renner, Otto, Boisselle & Sklar, LLP

(57) ABSTRACT

An active matrix devise comprises an array of picture elements. Each picture element has an image element, such as an LCD cell (11) connected to a first storage capacitor 12 and arranged to be connected to a data line 4 by an thin film transistor 10 when activated by a scan signal on a scan line 6. A second storage capacitor 21 can be connected across the first capacitor 12 by means of another thin film transistor 20 when desired so as to increase the storage capacitance at the pixel.

27 Claims, 20 Drawing Sheets

ACTIVE MATRIX DEVICE AND DISPLAY

BACKGROUND OF THE INVENTION

1. Field of the Invention

The present invention relates to an active matrix device, for example for use as a display. The device may comprise a liquid crystal active matrix display implemented using thin film transistor (TFT) techniques, for example based on amorphous silicon or high or low temperature poly-silicon. Such displays may be used in portable battery-powered equipment.

2. Description of the Related Arts

FIG. 1 of the accompanying drawings illustrates a conventional type of active matrix device comprising an active matrix 1 of N rows and M columns of picture elements (pixels) such as 2. The pixels of each column are connected to a data line driver 3 by a respective data line such as 4. The data line driver 3 has an input 5 for receiving timing, control and data signals.

The pixels of each row are connected by a respective scan line such as 6 to a scan line driver 7. The scan line driver 7 is synchronised by the timing signals from the input 5 and activates one scan line 6 at a time in a repeating sequence.

FIG. 2 of the accompanying drawings illustrates four active matrix pixels of known type. Each pixel comprises a TFT 10 whose gate is connected to the scan line 6 and whose source is connected to the data line 4. The drain of the TFT 10 is connected to a pixel electrode 11 and to a first terminal of a storage capacitor 12, whose second terminal is connected to a common electrode line 13 which is shared by all of the storage capacitors 12 of the same row of pixels. The common electrode lines 13 of all of the rows are connected to a common DC supply voltage.

In use, the TFTs 10 of the pixels act as switches with the switching being controlled by the signals on the scan lines 6. Each pixel 2 of the active matrix is then updated at a frequency known as the frame rate. Updating of a single frame of image data is generally performed on a row-by-row basis. For each row of pixels, the data line driver 3 receives a row of image data to be displayed and charges the M data lines 4 to the corresponding analogue voltages. The scan line driver 7 activates one of the scan lines 6 so that all of the TFTs 10 connected to the activated scan line are switched on. The TFTs 10 transfer charge from the data lines 4 to the storage capacitors 12 until the voltage across each capacitor is equal to the voltage on the data line. The scan line driver 7 then deactivates the row of TFTs 10, whose source-drain paths return to a high impedance state.

Active matrix addressing may be further sub-divided into two categories, namely panel-sample-and-hold addressing (also referred to as point-at-a-time addressing) and line-at-a-time addressing. In the former scheme, the data lines are usually isolated from the data line charging circuits of the data line driver 3 when each scanned line is activated. In the latter scheme, the data lines are normally continuously driven during the scan line activation time.

The non-infinite impedance of each TFT 10 when switched off results in charge flow or leakage between each storage capacitor 12 and the data line 4 for that column. This results in an undesirable change in the voltage at the pixel electrode 11 with consequent impairment of image quality. The magnitude of the voltage change depends on the size of the leakage current, the size of the storage capacitor 12 and the duration between pixel updates i.e. the frame rate.

The leakage current of a TFT can be reduced by device design modifications which require changes to the fabrication process. For example, it is possible to introduce a lightly doped drain (LDD) which, in addition to reducing high drain fields, also increases the channel resistance. Such TFT switch may also be implemented as a dual or triple gate device, effectively putting two or three switches in series between the data line and the pixel electrode. This results in an increase in the channel resistance and a reduction in the "on" performance of the TFTs.

U.S. Pat. No. 5,517,150 discloses an arrangement of the type shown in FIG. 3 of the accompanying drawings. The pixel arrangement differs from that shown in FIG. 2 of the accompanying drawings by the provision of a further TFT 15 whose source-drain path is connected between the drain of the TFT 10 and the pixel electrode 11. Also, a further capacitor 16 in connected between the common line 13 and the connection between the TFTS 10 and 15.

When the scan line 6 for a particular pixel is activated, both of the transistors 10 and 15 are turned on so that both of the capacitors 12 and 16 are charged from the data line 4. When the scan line is deactivated, both transistors are switched off. As described above, the charge leakage through the transistor 10 results in a variation of the voltage across the capacitor 16. However, there is only a very small drop in voltage across the transistor 15 and hence a much smaller leakage current so that there is a much smaller change in voltage across the capacitor 12 and hence at the pixel electrode 11.

Pixel voltage changes caused by charge leakage may be made smaller by increasing the value of the storage capacitor 12. However, the storage capacitor cannot be made arbitrarily large. For example, if the display is of the transmissive type, a large storage capacitor may reduce the pixel aperture ratio and therefore the display brightness. Also, it may not be possible to charge fully a relatively large storage capacitor with a relatively small TFT during the available scan line activation time. For panel-sample-and-hold displays the charge on the data line, which has capacitance Cl, is shared with the storage capacitor, which is of capacitance Cs. As a result, the voltage written to the pixel is not the same as that (V1) sampled onto the data line 4. This Voltage disparity ΔV increases with the capacitance of the storage capacitor and, if it is assumed that the storage capacitor is initially uncharged, is given by the expression:

$$\Delta V = \frac{Cs}{Cs + Cl} V1$$

Although it is possible to increase the frame rate in order to minimise the duration for which the pixel voltage has to be held constant, this may not be a practical option. For example, it may not be possible to charge the data lines or storage capacitors during the reduced addressing periods or the power consumption may be increased beyond what is acceptable. For low power applications, it may be desirable to update the active matrix at a relatively low frame rate in order to reduce power consumption.

U.S. Pat. No. 6,023,074 discloses a pixel TFT arrangement similar to that disclosed in U.S. Pat. No. 5,517,150. However, the storage capacitors are implemented as metal-oxide-semiconductor (MOS) capacitors. As shown in FIG. 4 of the accompanying drawings, a MOS capacitor is formed by a transistor 18 whose gate g forms one terminal of the capacitor and whose sources and drain d are connected together to form the other terminal. The connection between the source and drain may be achieved by heavily doped semiconductor rather than by "ohmic" contact connections to a separate interconnect layer. The effective capacitance of the device is voltage dependent an illustrated by the graph in FIG. 4. Below the threshold voltage Vt of the MOS device, the capacitance is equal to the sum of the gate-source and gate-drain overlap capacitances. Above the threshold voltage Vt, the capacitance changes to include the MOS oxide capacitance in addition to the overlap capacitances.

U.S. Pat. No. 5,835,170 discloses an arrangement of the type shown in FIG. 5 of the accompanying drawings, in which the common electrode lines 13 are omitted and the second terminals of the capacitors 12 are connected to the scan line 6 of the adjacent row of pixels. An advantage of such a capacitor-on-gate arrangement is that the total number of horizontal signals traversing the active matrix 1 is halved compared with the arrangement shown in FIG. 2 so that a higher pixel aperture ratio may be achieved. However, the scanning direction of the active matrix 1 is fixed. In particular, the rows or the active matrix must be scanned from the bottom row upwards in FIG. 5.

SUMMARY OF THE INVENTION

According to the invention, there is provided an active matrix device comprising an array of picture elements, each of which comprises and image element, a first charge storage element connected to the image element, and a first semiconductor switch for connecting a data line to the first element charge storage and the image element, characterised in that each picture element comprises a second charge storage element and a second semiconductor switch switchable independently of the first switch to connect the second charge storage element to the first charge storage element and the image element so as to increase the charge storage capacity.

Each image element may be a light modulating element and may be transmissive or reflective. For example, each image element may be a liquid crystal element.

Each image element maybe a light emitting element.

Each of the first and second switches may be a thin film transistor.

The charge storage capacity of the second charge storage element may be greater than that of the first charge storage element.

For each picture element, the second charge storage element and the second switch may connected in series across the first charge storage element.

The picture elements may be arranged as rows and columns with the picture elements of each column being connected to a respective data line and the picture elements of each row being connected to a respective scan line.

The second switches of each row of picture elements may have control terminals connected to a respective control line. The control lines may be connected together.

For each picture element, the second switch may have a control terminal connected to first terminals of the first and second charge storage elements.

The first and second charge storage elements of each row of picture elements may have first terminals connected to a respective common line.

The first and second charge storage elements of each adjacent pair of rows of picture elements may have first terminals connected to a respective common line.

The first and second charge storage elements of each row of picture elements may have first terminals connected to the scan line of an adjacent row.

The first and second charge storage elements of each picture element may comprise first and second capacitors, respectively. The first and second capacitors of each picture element may have a common plate. The common plate may comprise a part of a gate metal interconnect layer. The first capacitor of each picture element may have a further plate comprising part of a source metal interconnect layer. The second capacitor of each picture element may have a further plate comprising part of a heavily doped silicon layer.

The second capacitor of each picture element may have a dielectric comprising gate oxide. The second capacitor of each picture element may comprise a metal oxide silicon capacitor. The metal oxide silicon capacitor may form the second switch and may have source and drain terminals connected to the first switch and the image element. The first capacitor of each picture element may comprise the gate/source overlap capacitance and the gate/drain overlap capacitance of the metal oxide silicon capacitor. The metal oxide silicon capacitor may have a lightly doped drain below the gate electrode.

According to a further aspect of the invention, there is provided a display comprising a device according to the first aspect of the invention.

It is thus possible to provide a device in which the storage capability at each pixel may be changed so as to permit operation of the active matrix in different modes, for example so an optimize image quality and power consumption performance. For example, such a device may be operated with the lower storage capacity which allows faster and more accurate updating to provide operation at a relatively high frame rate with a high quality image. For lower power consumption, a lower frame rate mode may be chosen with the larger storage capacity at the pixels so as to reduce or prevent image corruption by charge leakage during intervals between pixel updates.

BRIEF DESCRIPTION OF THE DRAWINGS

The invention will be further described, by way of example, with reference to the accompanying drawings, in which.

Like reference numerals refer to like parts throughout the drawings.

DESCRIPTION OF THE PREFERRED EMBODIMENTS

Figure 1:
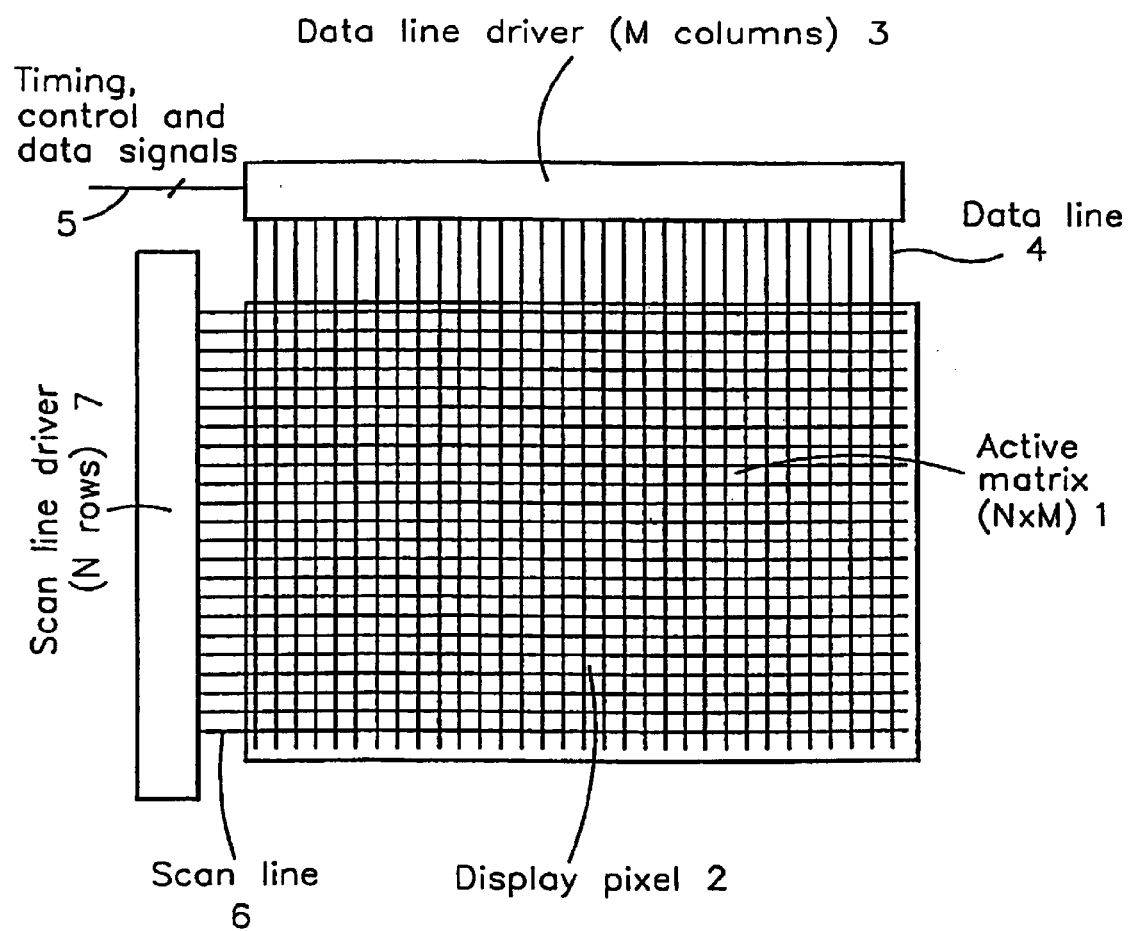
FIG. 1 illustrates schematically a know active matrix display.
Figure 2:
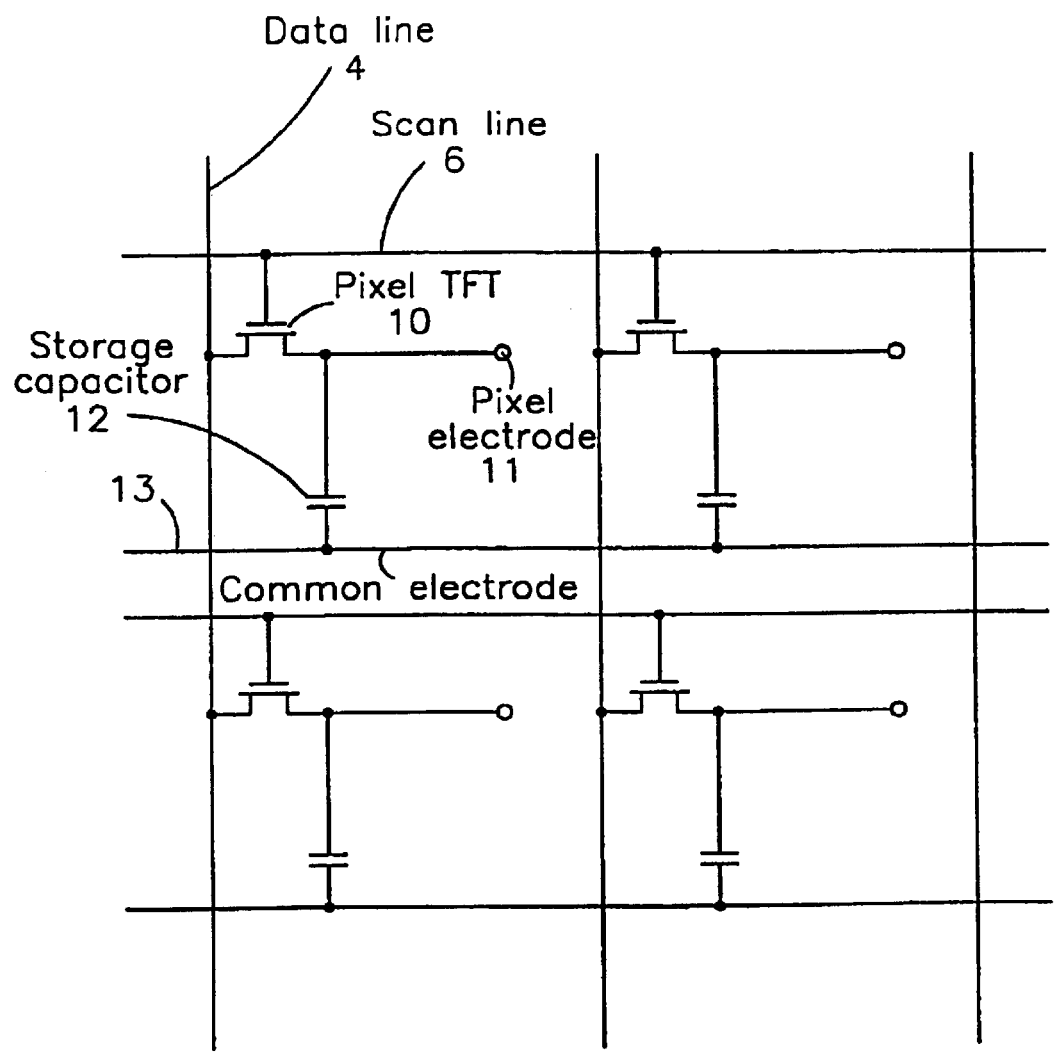
FIG. 2 is a circuit diagram of active matrix pixels of a known type of display.
Figure 3:
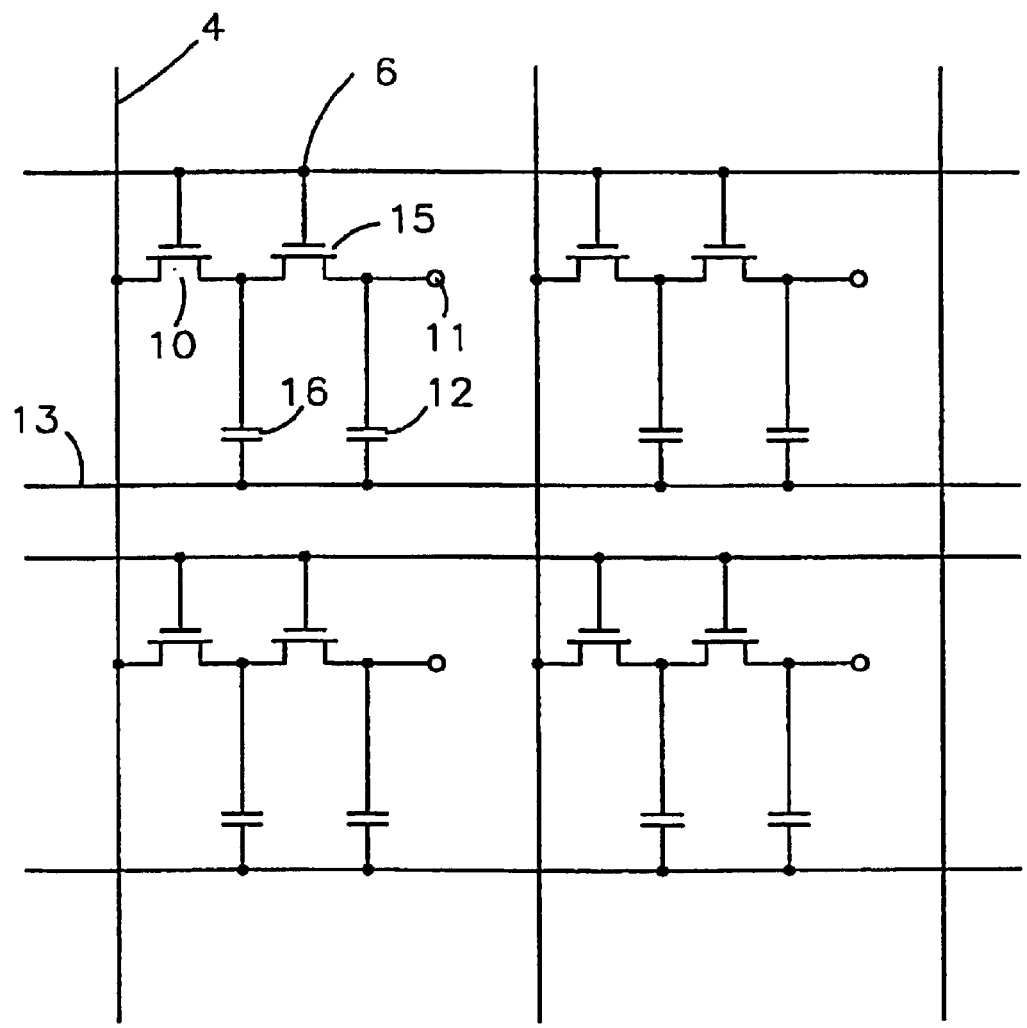
FIG. 3 is a circuit diagram of active matrix pixels of another known type of display.
Figure 6:
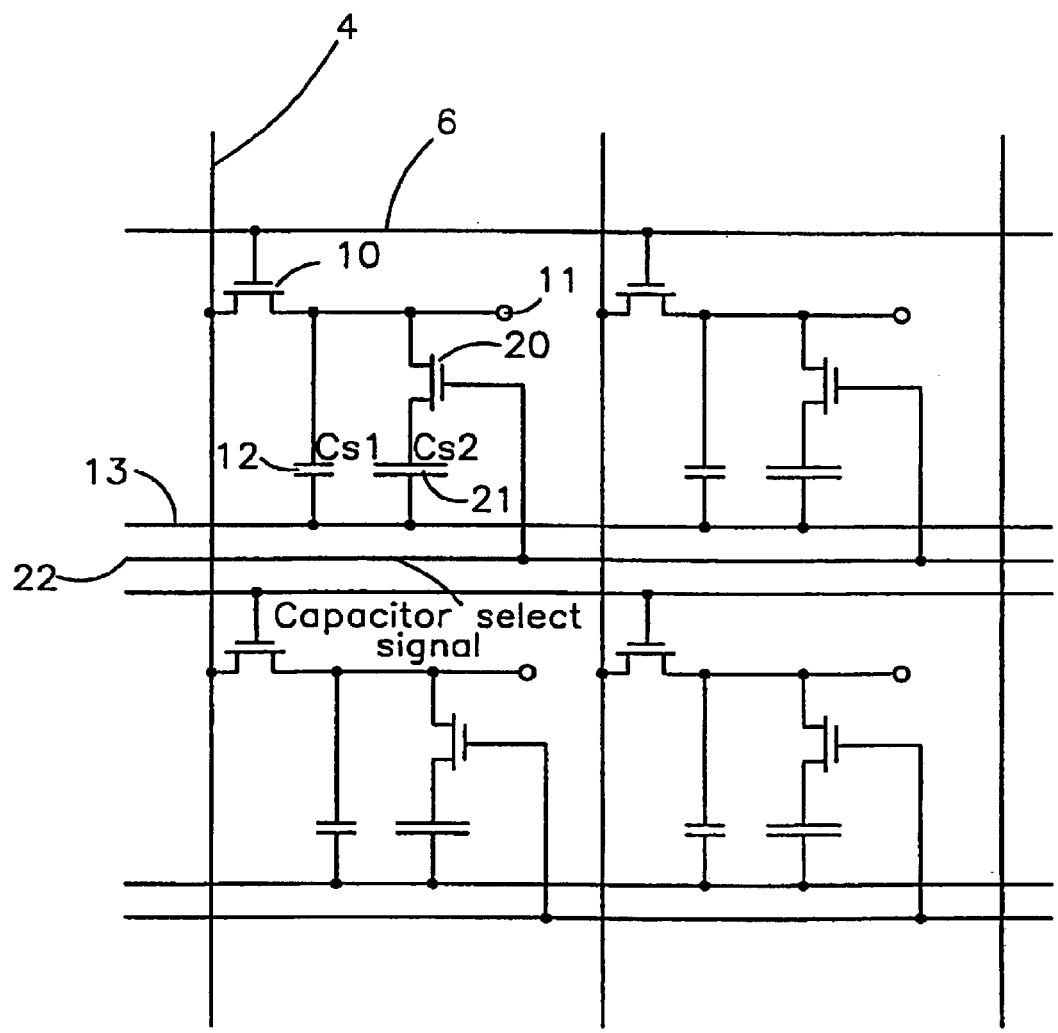
FIG. 6 is a circuit diagram of pixels of a device constituting a first embodiment of the invention.

FIG. 6 shown four pixels of an active matrix device, for example in the form of a liquid crystal display panel. Each of the pixels comprises a TFT 10, a storage capacitor 12, and a pixel electrode 11 as described hereinbefore with reference to, for example, FIG. 2. In addition, each pixel comprises a further TFT 20 whose drain (or source) is connected to the pixel electrode 11 and whose source (or drain) is connected to a first plate of another storage capacitor 21, whose other plate is connected to the common electrode line 13. The gate of the TFT 20 is connected to a capacitor select line which is common to the row of pixels. The capacitance Cs2 of the capacitor 21 need not be the same as the capacitance Cs1 of the capacitor 12 and may, for example, be substantially higher, for example of the order of five times the value.

Each pixel has associated with it one vertical signal wire and three horizontal signal wires. The vertical wire may be fabricated with the source metal interconnect layer and the horizontal wires may be fabricated with the gate metal interconnect layer.

The active matrix device may operate in either of two modes. In the first modes, the capacitor select signal lines are connected to a relatively low voltage. In this mode, the TFTs 20 of all of the pixels are turned off so that the capacitor 21 is effectively disconnected from the pixel electrode 11. This is a relatively low capacitance mode in which the storage capacitance at each of the pixels to substantially equal to the value Cs1 of the storage capacitors 12. In the other higher capacitance mode, the lines 22 are connected to a relatively high voltage so that the transistors 20 at all of the pixels are turned on and the capacitor 21 is connected in parallel with the capacitor 12 at each pixel. In this mode, the storage capacitance is equal to the sum of the values Cs1 and Cs2 of the capacitors 12 and 21.

Figure 7:
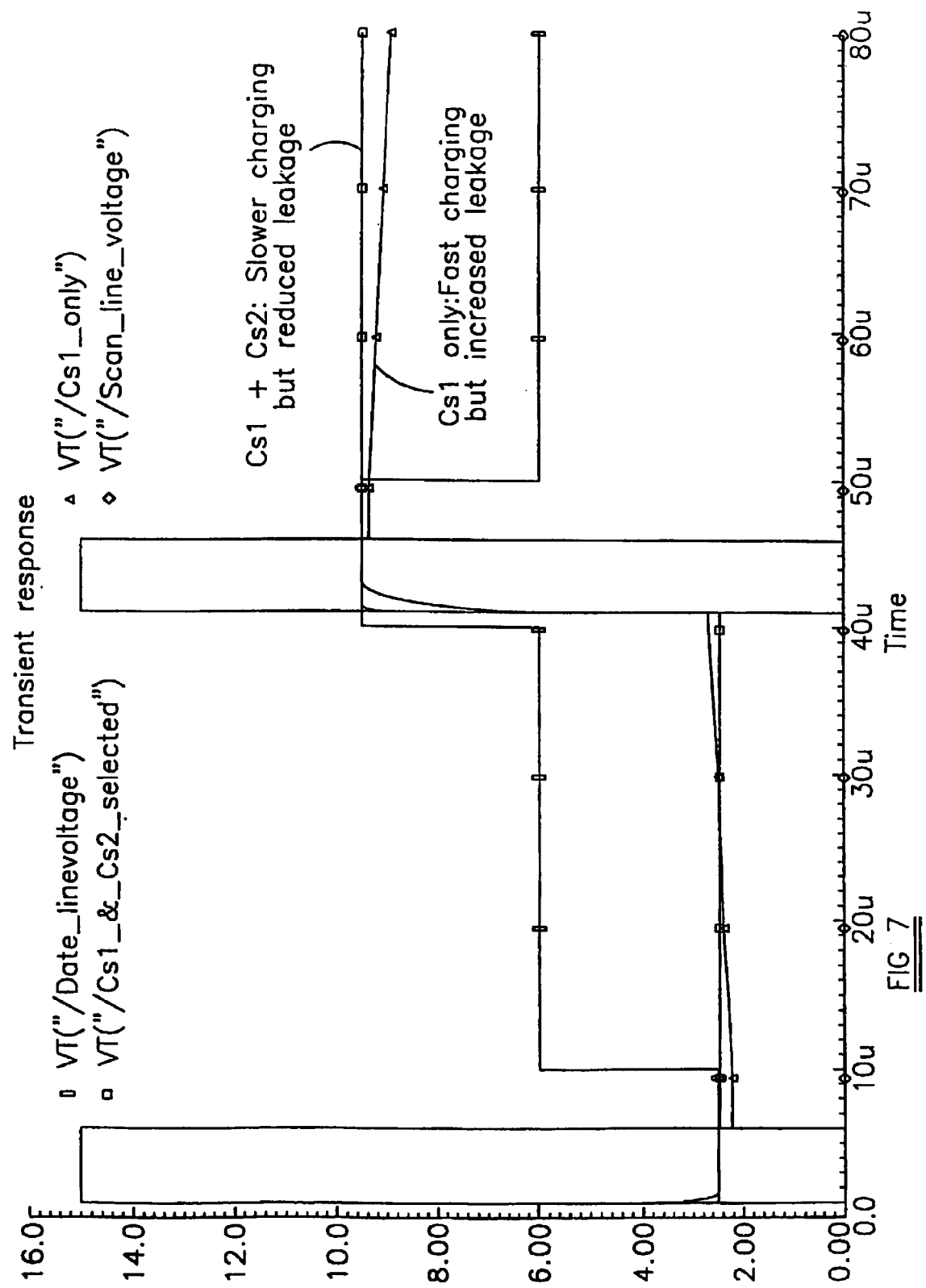
FIG. 7 is a waveform diagram illustrating simulated operation of the pixels shown in FIG. 6 in two modes of operation.

FIG. 7 is a waveform diagram showing voltage in volts against time in microseconds representing the result of a simulation of the device of FIG. 6 operating in both the low capacitance and high capacitance modes. The simulation represents a liquid crystal pixel cell receiving a voltage of −3.5 volts in one frame and +3.5 volts in the next frame. The pixel voltage is relative to a counter electrode potential of 6 volts so that the voltage supplied to the pixel electrode 11 is 2.5 volts in the first frame and 9.5 volts in the second frame. The scan line activation frequency and leakage have been adjusted so that the relative effects can be observed within a reasonable simulation time. The value Cs1 of the capacitor 12 is 100 fF, which is typical for a small direct view active matrix liquid crystal display. The value Cs2 of the capacitor 21 to 500 fF.

In the low capacitance mode of operation, pixel charging occurs very quickly. However, when the scan line goes low, there is considerable charge injection from the overlap capacitance of the TFT 10. Also, leakage from the storage capacitor 2 is very significant. As the pixel electrode voltage moves towards the data line voltage in the high capacitance mode of operation, pixel charging takes longer, there is less charge injection when the transistor 10 turns off, and the leakage is substantially lower.

Figure 8:
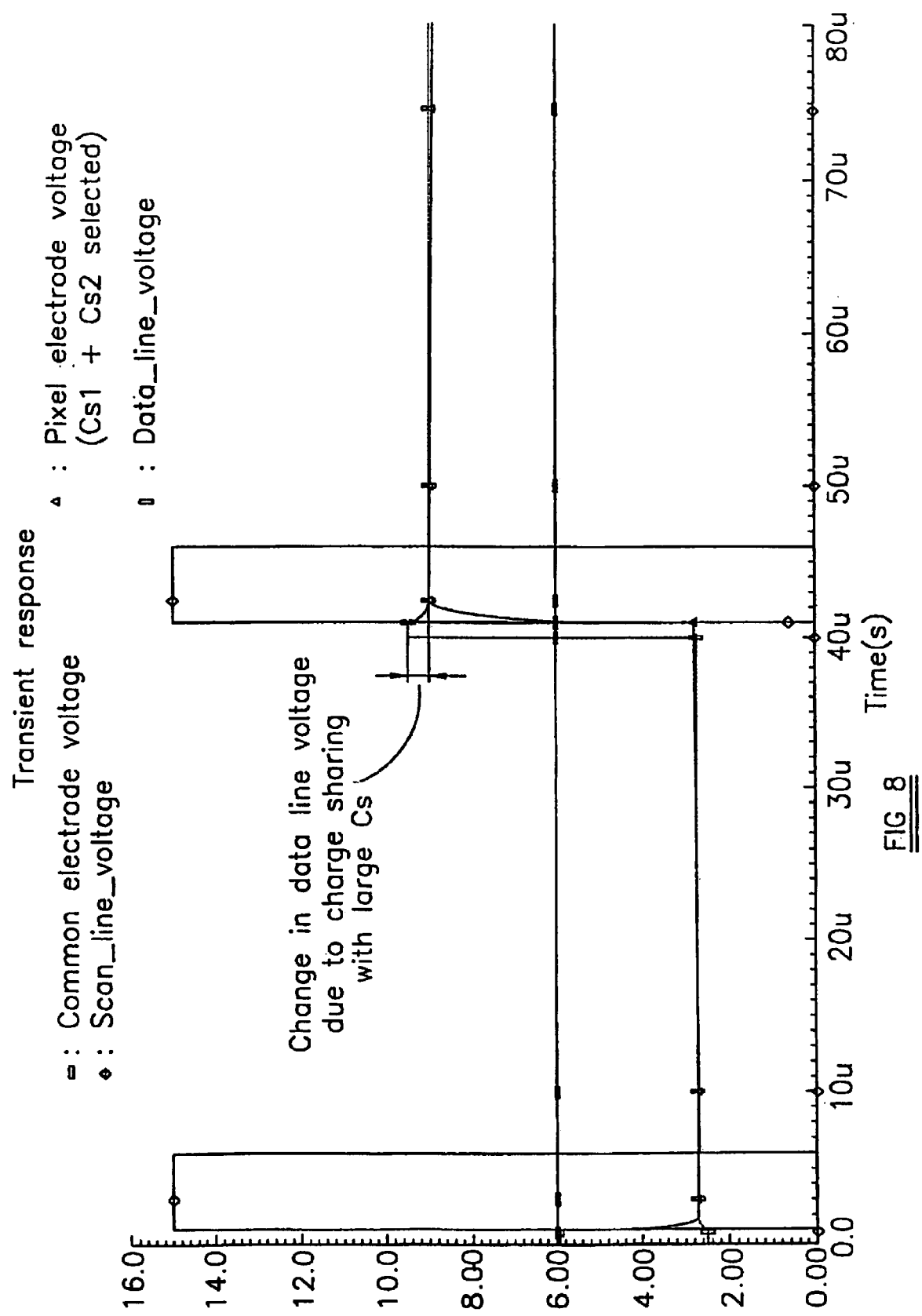
FIG. 8 is a waveform diagram illustrating the result of simulation of the operation of the pixels of FIG. 6 in a panel-sample-and-hold device.

The simulation result does not illustrate the corruption caused to the data line voltage by virtue of charge sharing in a panel-sample-and-hold type of display. For a small direct view active matrix liquid crystal display, the data line capacitance is typically 10 pF. For the same storage capacitances, in the low capacitance mode, the change in voltage occurring at the pixel is approximately 1% of the desired data line voltage. In the high capacitance mode, the change in voltage is closer to 6%. The effect of this is illustrated in FIG. 8. Just prior to the second scan period, the data line is initially at 9.5 volts. When the scan line is activated, both the data line and the capacitors 12 and 21 share charge. The net effect is that the pixel electrode 11 ends up at 9.1 volts instead of the desired 9.5 volts.

Implementation of the additional storage capacitor 21 of 500 fF together with an extra TFT 20 at each pixel substantially reduces the pixel aperture ratio in small transmissive liquid crystal displays, particularly if the gate and source metal interconnect layers are used to form the parallel plate storage capacitor. However, the pixel aperture ratio is not substantially affected in reflective or transmissive-reflective display where the additional elements 20 and 21 maybe disposed underneath a reflective electrode.

The increased pixel charging time for the high capacitance mode of operation requires careful consideration, especially when the TFTs 10 and 20 are of the amorphous silicon type. The mobility of such devices is very low, for example 1 $cm^2/Vs$, which limits the rate of charge flow from the data line 4 to the storage capacitors 12 and 21. It may therefore be necessary or desirable to slow down the active matrix addressing in order for the pixels to be fully charged. Alternatively, it may be possible to write the same image date to the active matrix in consecutive frames so as to ensure satisfactory cell charging. Such techniques may be accommodated by timing modifications in the data line driver 3 and the scan line driver 7. In displays fabricated with high performance poly-silicon TFTs 10 and 20, which may have a mobility in excess of 50 $cm^2/Vs$, the high capacitance mode is unlikely to require an extended pixel charging period.

Reduced accuracy in point-at-a-time display addressing in the high capacitance mode may be compensated within the data line driver or within a liquid crystal driver controller (not shown) to which the display is connected. Such compensation is standard practise since it is generally necessary to compensate for the non-linear voltage/transmission response of liquid crystal pixels; this is generally called "gamma correction". Nevertheless, accommodation of two compensation schemes within driver circuitry for the high and low capacitance modes represents a significant overhead. It in likely that the display will be operated in the high capacitance mode with reduced frame rates, mainly to reduce power consumption. When this is the case, achieving high grey-scale accuracy is less important. For example, the display may be operated in a low frame rate 1 bit colour mode. Any inaccuracies caused by charge sharing in such a 1 bit colour mode are unlikely to present substantial image quality problems.

Figure 9:
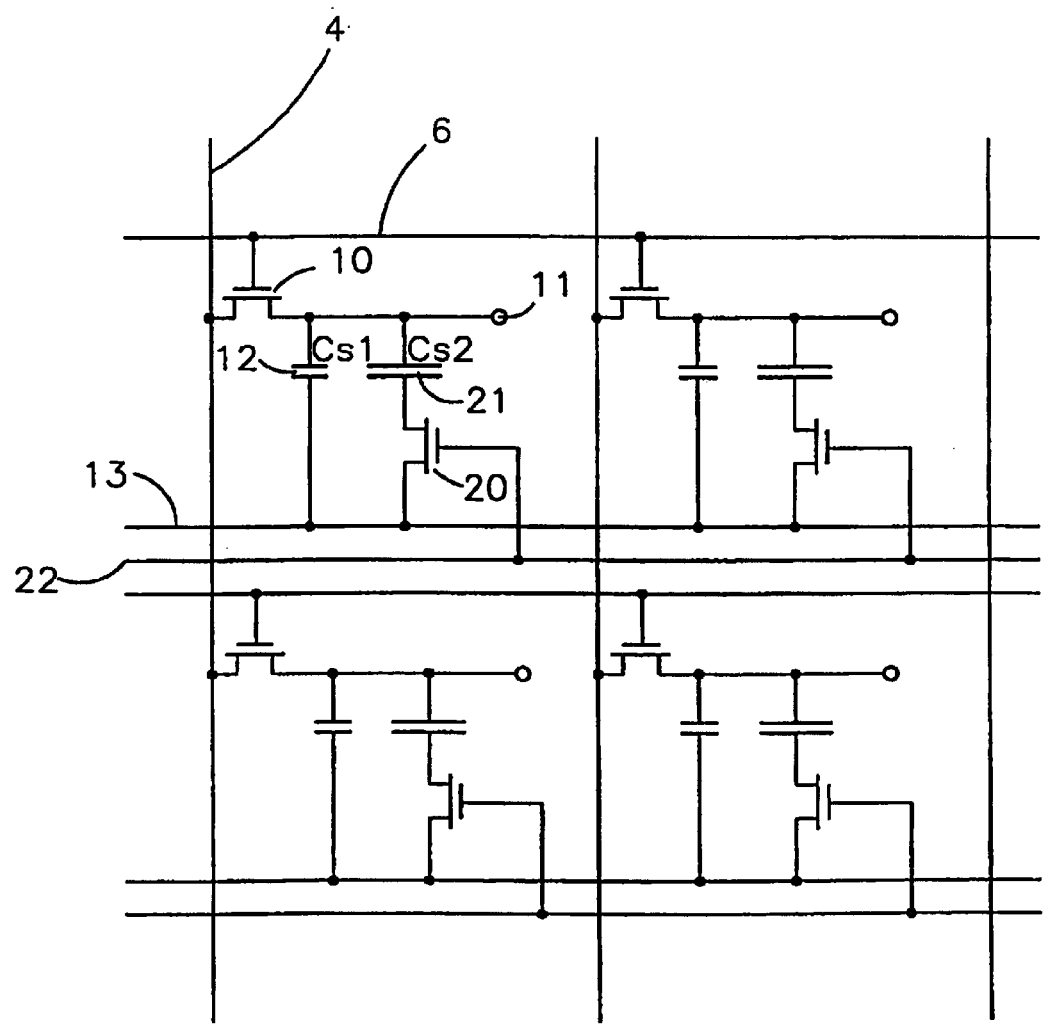
FIG. 9 is circuit diagram of four pixels of a device constituting a second embodiment of the invention.

The embodiment illustrated in FIG. 9 differs from that illustrated in FIG. 6 in that the positions of the TFT 20 and the capacitor 21 have been interchanged. However, operation is not affected by this.

Figure 5:
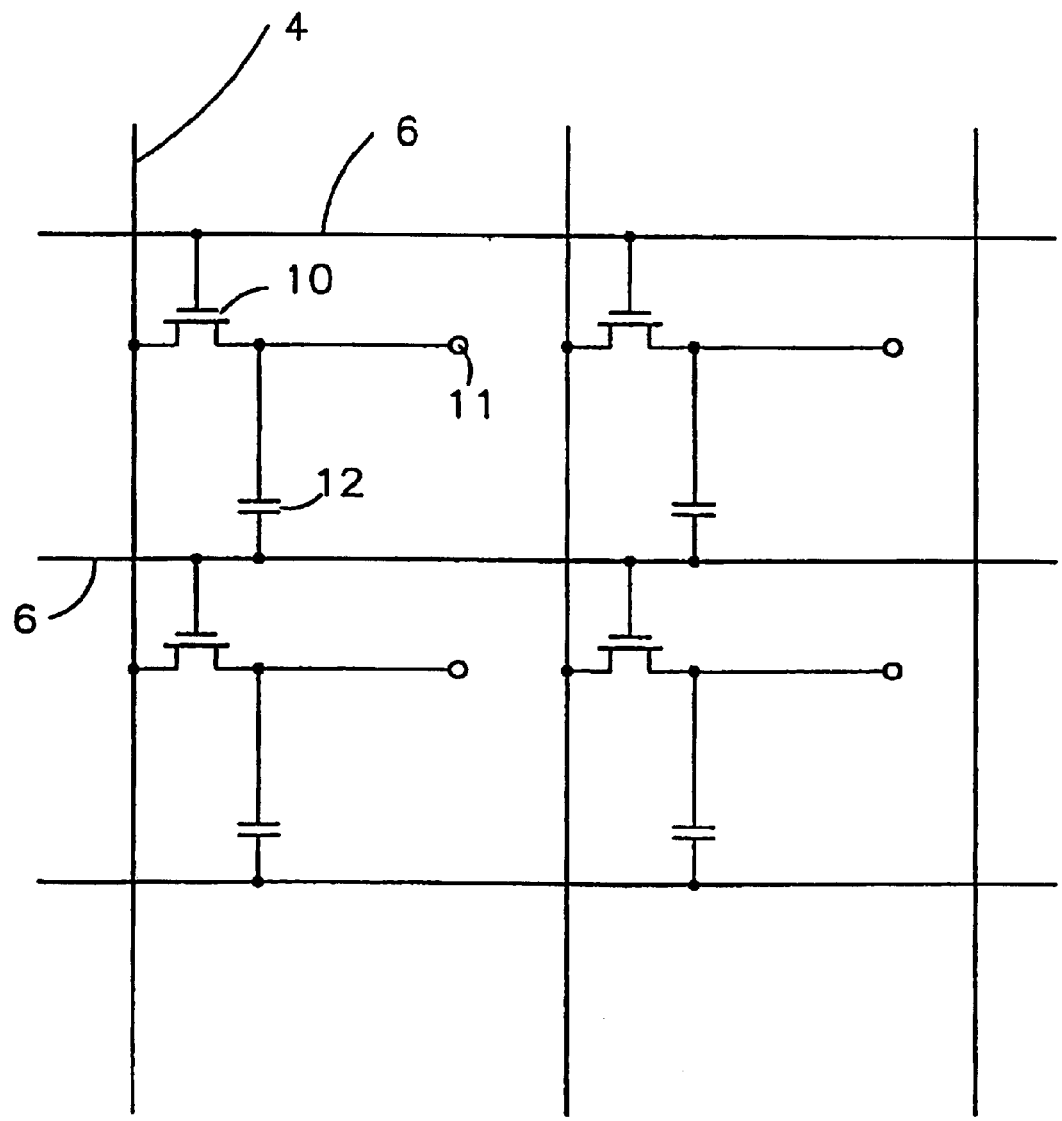
FIG. 5 is a circuit diagram of pixels of a further known type of device.
Figure 10:
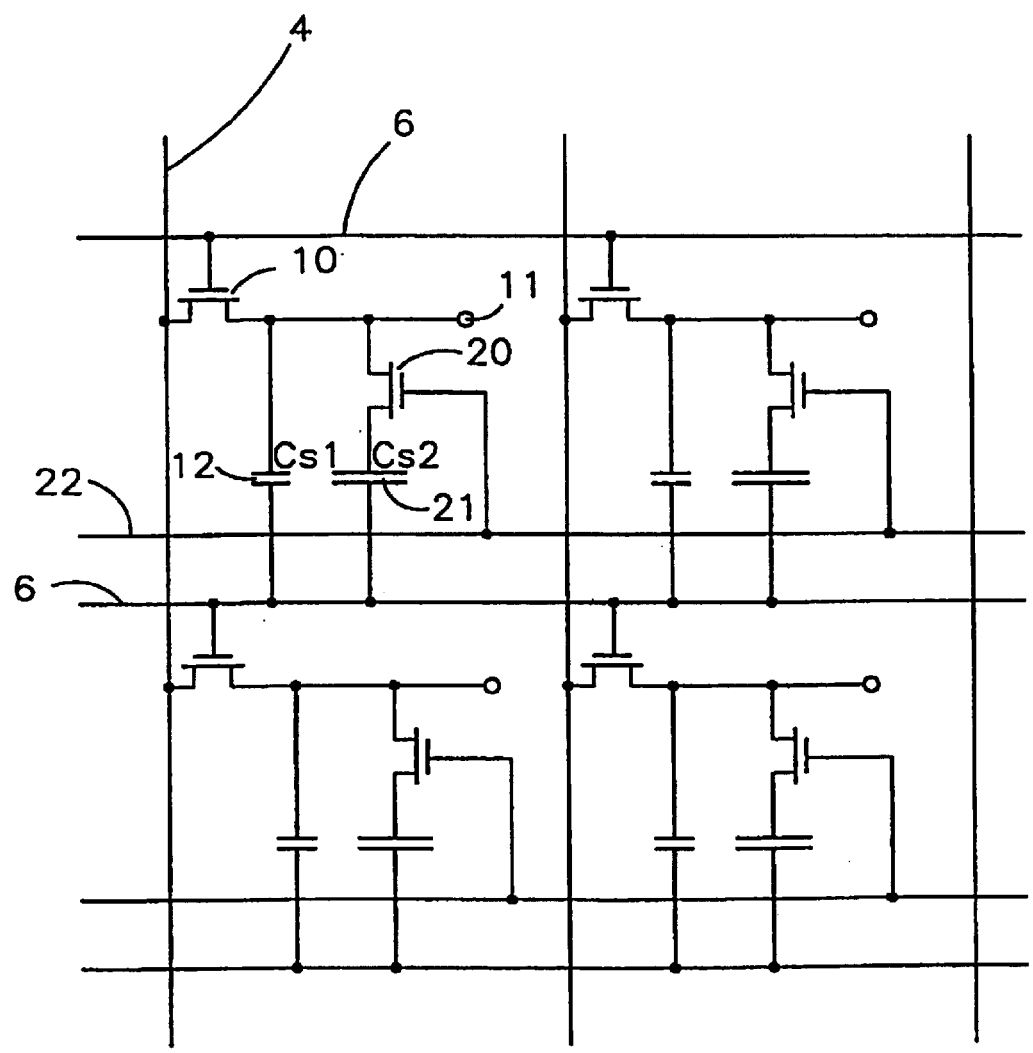
FIG. 10 is a circuit diagram of four pixels of a device constituting a third embodiment of the invention.

The device illustrated in FIG. 10 differs from that illustrated in FIG. 6 in that a capacitor-on-gate technique of the type illustrated in FIG. 5 is used to reduce by one the number of horizontal signals traversing each row of the active matrix. Thus, the lower plates of the capacitors 12 and 21 are connected to the scan line 6 of the adjacent row of pixels so that the common line 13 is not needed. The scan lines are used to supply a DC voltage to the lower terminals of the capacitors 12 and 21 and are at zero volts for most of the time. However, the scan lines 6 are switched in turn to a high DC voltage in order to activate the TFTs 10 of the row of pixels. In order to avoid corrupting the voltages stored on the capacitors 12 and 21, such a switching operation should occur before the capacitors are charged. Thus, the active matrix illustrated in FIG. 10 should be scanned from the bottom row upwards.

Figure 11:
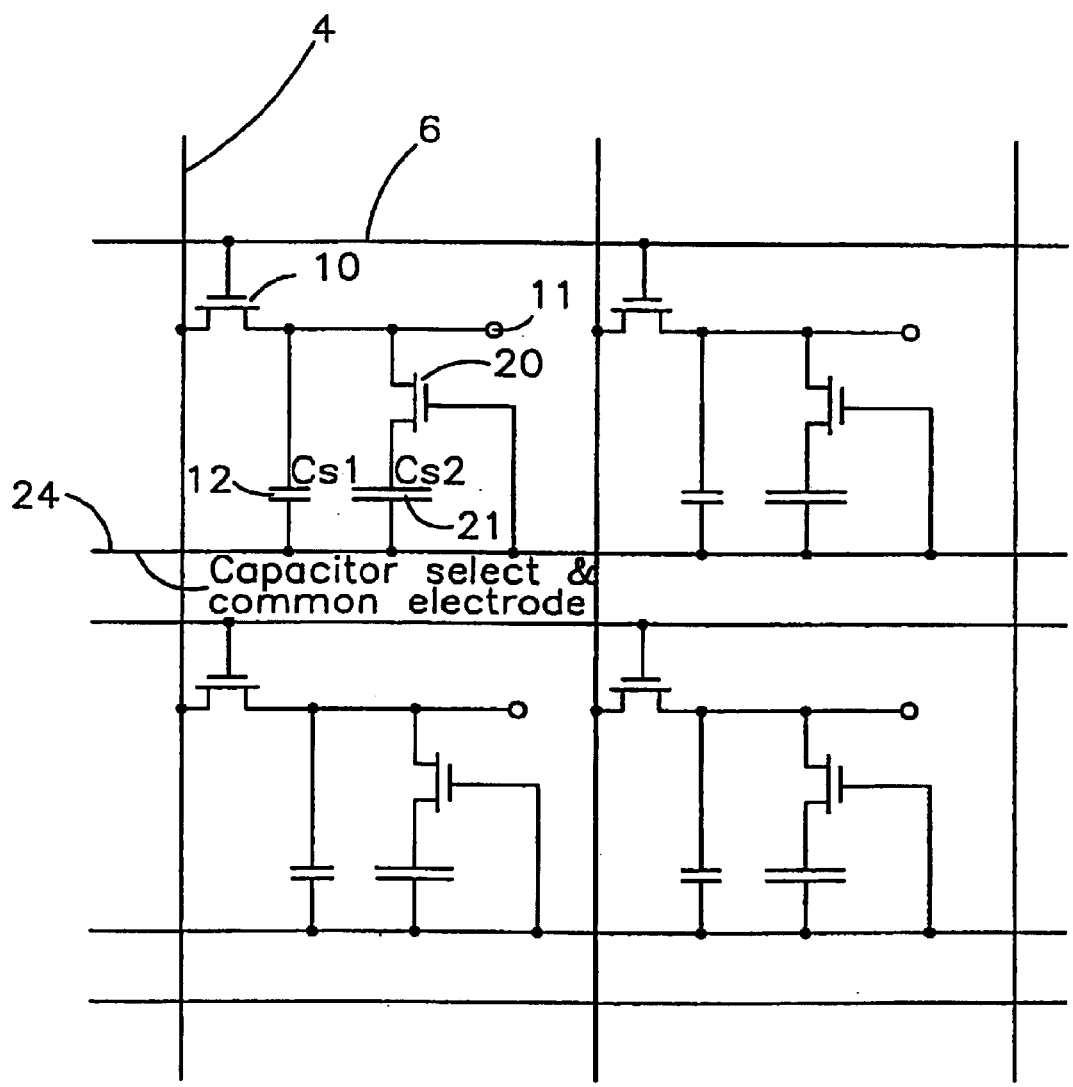
FIG. 11 is a circuit diagram of four pixels of a device constituting a fourth embodiment of the invention.

The device illustrated in FIG. 11 differs from that illustrated in FIG. 6 in that the common electrode line 13 and the capacitor select line 22 are replaced by a single line 24 connected to the further plates of the capacitors 12 and 21 and to the gate of the TFT 20. This is allowable because the capacitor select signal is essentially a DC signal once the mode of operation has been selected. In the low capacitance mode, the line 24 is connected to ground so that the TFT 20 is switched off and the effective storage capacitance is that provided by the capacitor 12. In the high capacitance mode, the line 24 in connected to the positive supply voltage Vdd so that the TFT 20 is switched on to connect the capacitor 21 across the capacitor 12. This technique may also be applied to the embodiments described hereinafter.

Figure 12:
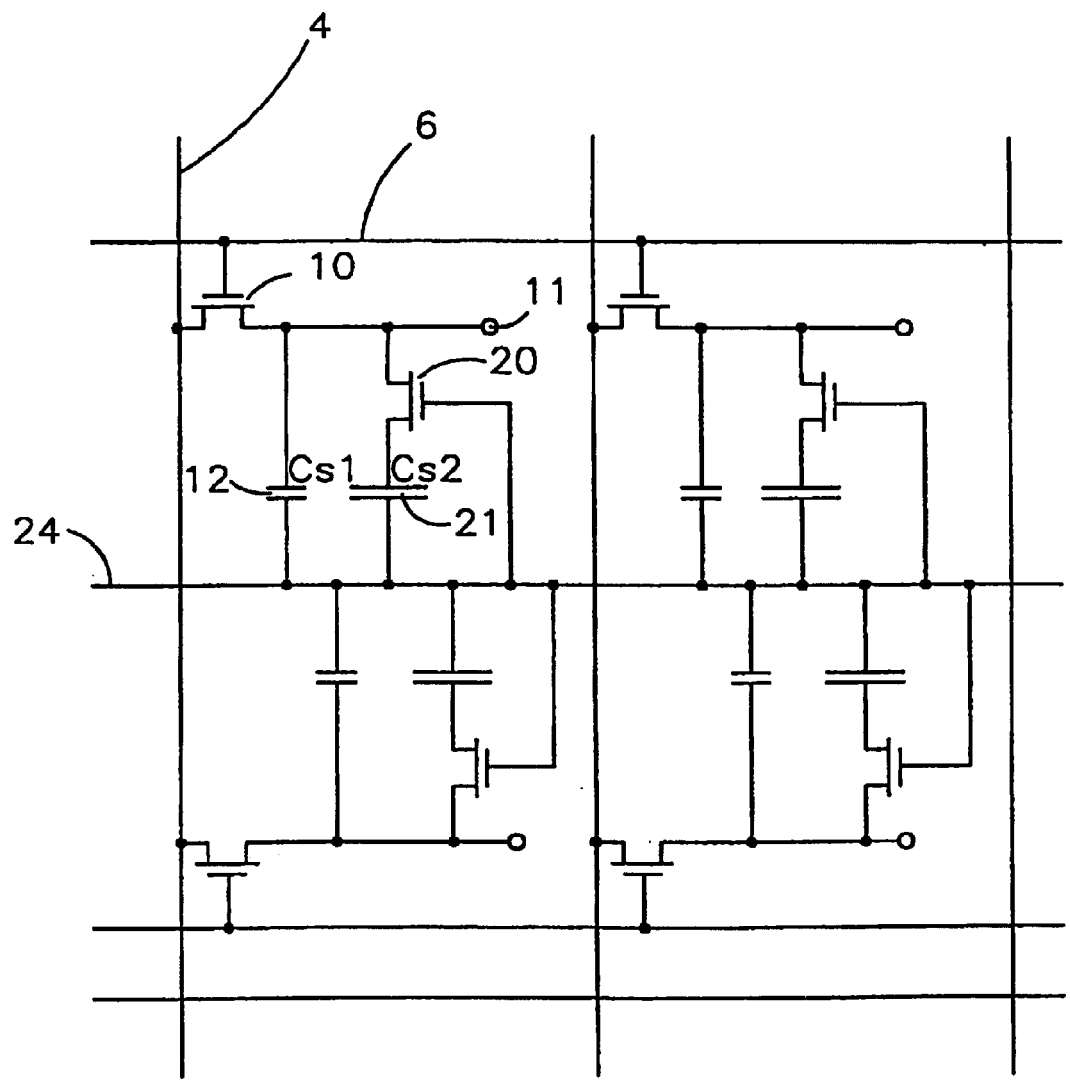
FIG. 12 is a circuit diagram of four pixels of a device constituting a fifth embodiment of the invention.

FIG. 12 illustrates a device which differs from that illustrated in FIG. 11 in that each capacitor select and common electrode line 24 is shared by an adjacent pair of rows of pixels. Thus, there are, an average, only 1.5 horizontal signals running through each row of pixels. This technique may also be applied to the embodiments described hereinafter.

Figure 13:
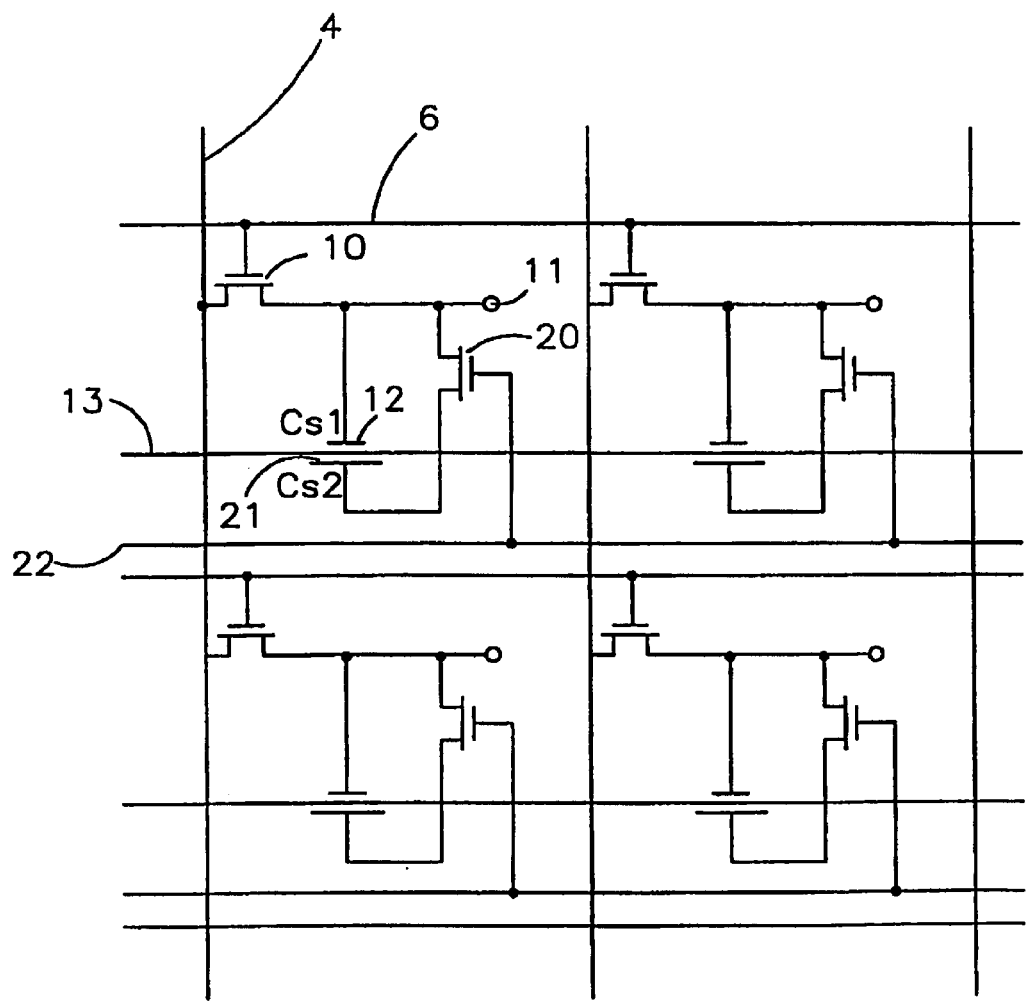
FIG. 13 is a circuit diagram of four pixels of a device constituting a sixth embodiment of the invention.

The device illustrated in FIG. 13 is similar to that illustrated in FIG. 6 in that each row of pixels has a common line 13 and a capacitor select line 22. However, the capacitors 12 and 21 share a common plate which forms part of a gate metal interconnect layer of the integrated structure in which the TFTs 10 and 20 are formed. The other plate of the capacitor 12 comprises part of the source metal interconnect layer whereas the other plate of the capacitor 21 forms part of a heavily doped amorphous or poly-silicon layer, for example of N-type material. In a typical TFT structure, the dielectric of the capacitor 21 is gate oxide so that the capacitance per unit area of the substrate for the capacitor 21 is substantially greater than that of the capacitor 12. This allows a much larger value of the capacitance Cs2 of the capacitor 21 to be achieved.

Figure 14:
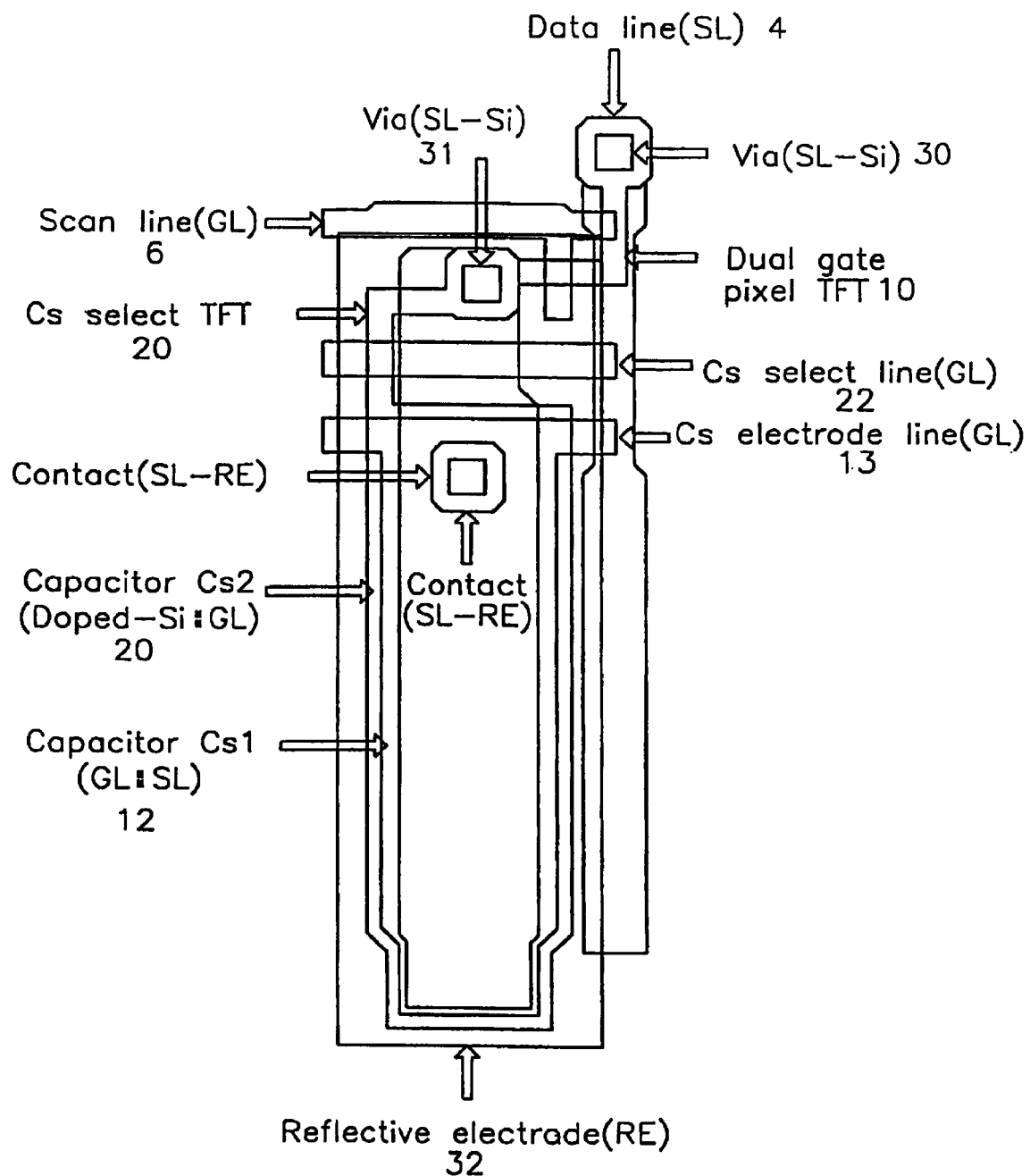
FIG. 14 illustrates an example of a mask layout of a pixel of the device shown in FIG. 13.

FIG. 14 shows the mask layout of a device of the type shown in FIG. 13 embodied an a reflective liquid crystal display with a poly-silicon dual-gate TFT structure. The data line 4 is implemented on the source metal interconnect layer (SL) and runs vertically at the right hand side of the pixel with a connection through a via 30 with a source of the TFT 10, which is of dual gate construction. The TFT 10 is crossed twice by the scan line 6, which is formed in the gate metal interconnect layer GL so that two series-connected TFT channels are formed at right angles to one another. This arrangement makes the device more robust to mask alignment errors.

At the drain of the TFT 10, a via 31 connects the terminal to a large SL electrode, which forms one plate of the capacitor 12 whose other plate is formed by part of the GL electrode line. The SL electrode is also in contact with a reflective electrode (RE) 32. The drain of the TFT 10 is also connected to a poly-silicon track which forms the transistor 20 where it is crossed by the capacitor select line 22. The poly-silicon track is then connected to a heavily doped poly-silicon electrode which forms the capacitor 21 in conjunction with the GL common electrode line 13.

Heavy doping of an amorphous or poly-silicon layer underneath a gate layer cannot normally be achieved using the conventional TFT process flow and is likely to require a further mask to define the heavy doping region.

Figure 4:
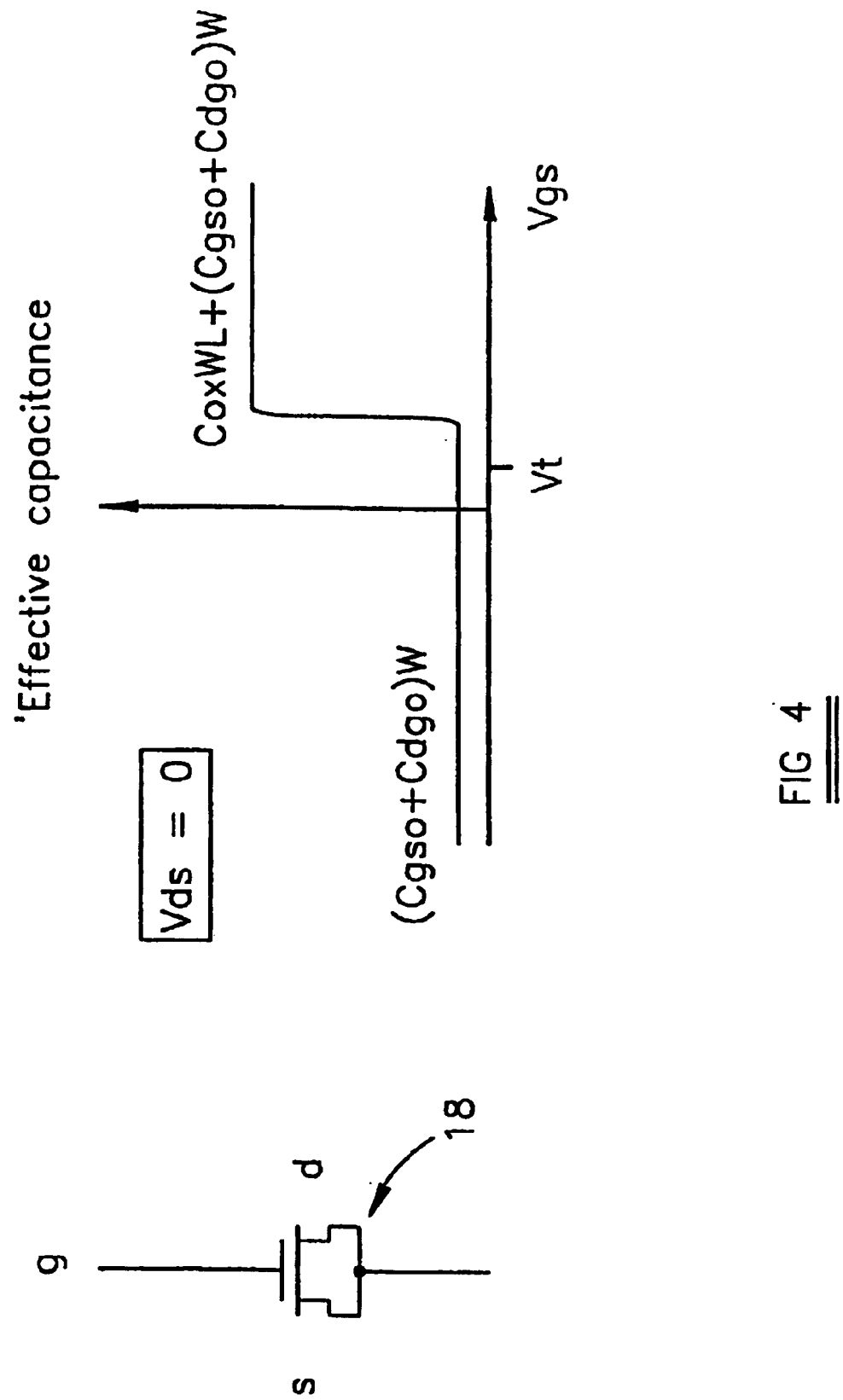
FIG. 4 illustrated a MOS capacitor and the capacitance against gate/source voltage of such a device.
Figure 15:
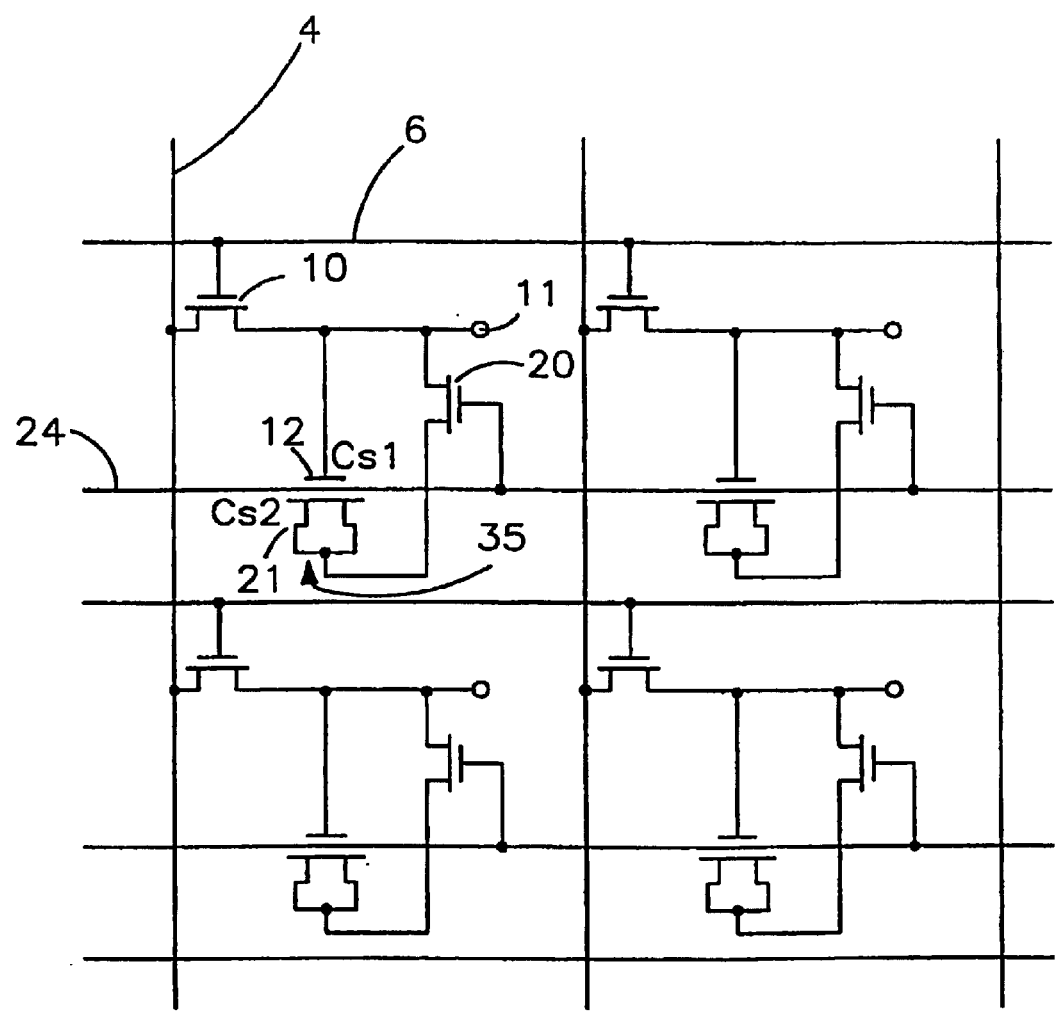
FIG. 15 is a circuit diagram of four pixels of a device constituting a seventh embodiment of the invention.

The device illustrated in FIG. 15 is of a type similar to that illustrated in FIG. 13 but using the single capacitor select and common electrode line 24 as shown in FIG. 11 and with the capacitors 12 and 21 embodied as a MOS capacitor. When the line 24 is connected to a low voltage, such as ground, the TFT 20 is switched off and the capacitor 12 is formed by a parallel plate capacitor between the layers SL and GL. When the select signal on the line 24 is high, for example at vdd, the TFT 20 is switched on and the MOS capacitor of value Cs2 is in parallel with the capacitor 12. The MOB capacitor 35 is formed by an amorphous or poly-silicon layer underneath a gate electrode. The gate electrode in formed by the capacitor select signal line routed on the layer GL and so is at a high potential which is above the threshold voltage Vt of the MOS structure 35. The total capacitance is then equal to the sum of the oxide capacitance and the overlap capacitances as described hereinbefore with reference to FIG. 4.

Figure 16:
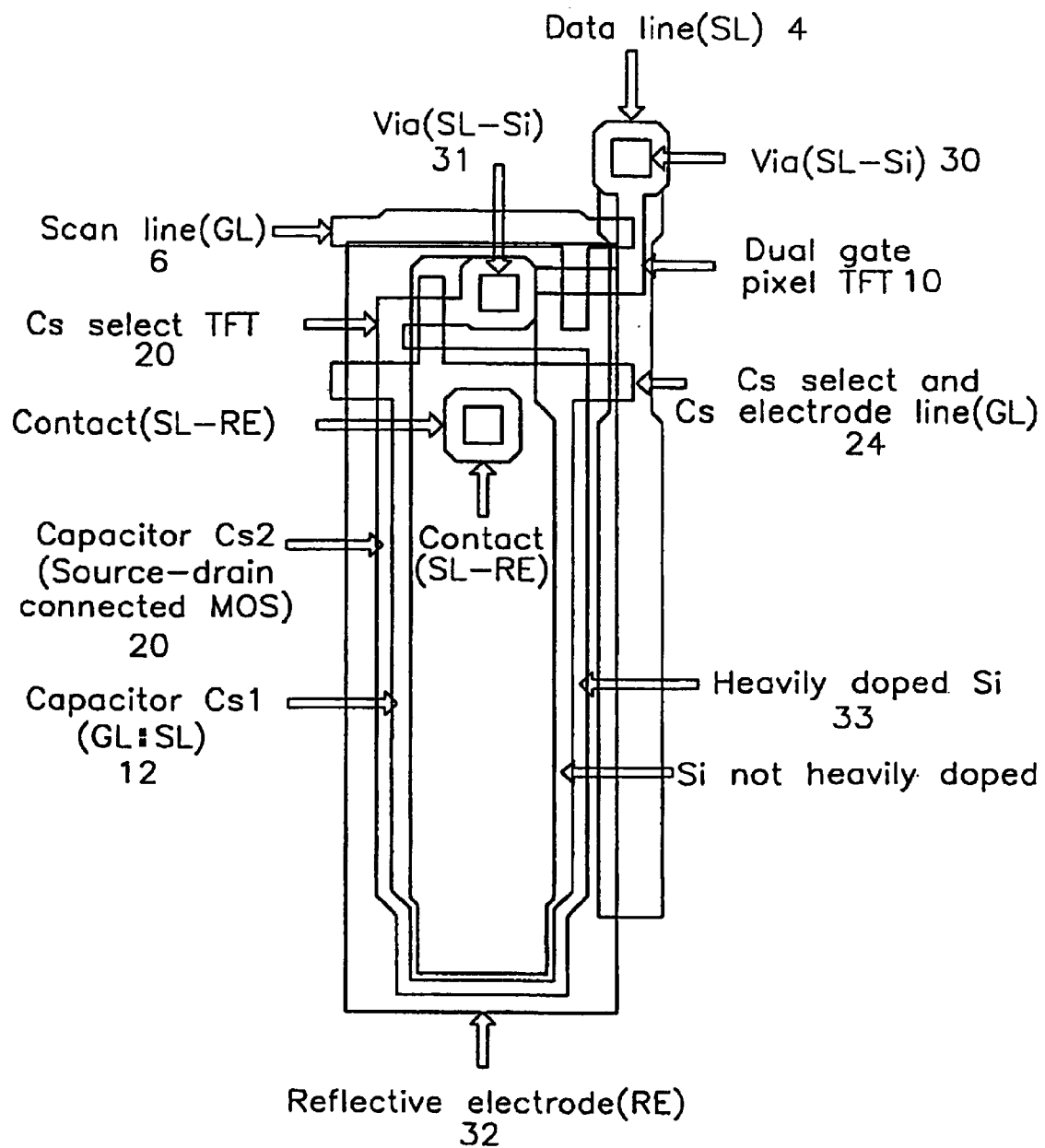
FIG. 16 shown an example of a mask layout of a pixel of the type shown in FIG. 15.

FIG. 16 illustrates a mask layout for the device of FIG. 15 embodied as a reflective poly-silicon dual-gate TFT structure. There are only two horizontal signals routed through the pixel. The poly-silicon layer of the MOS capacitor extends beyond the gate metal layer of the capacitor. In a normal self-aligned TFT fabrication flow, this region is heavily doped. As indicated at 33, this region continues around three edges of the MOS capacitor in order to form the necessary source-drain connection.

Figure 17:
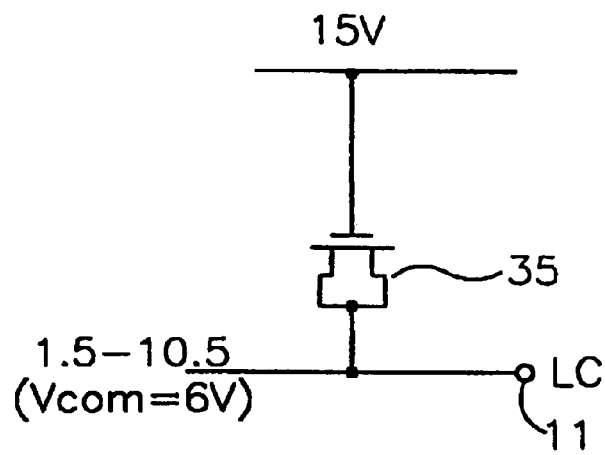
FIG. 17 illustrates schematically operation of an MOS capacitor.
Figure 17:
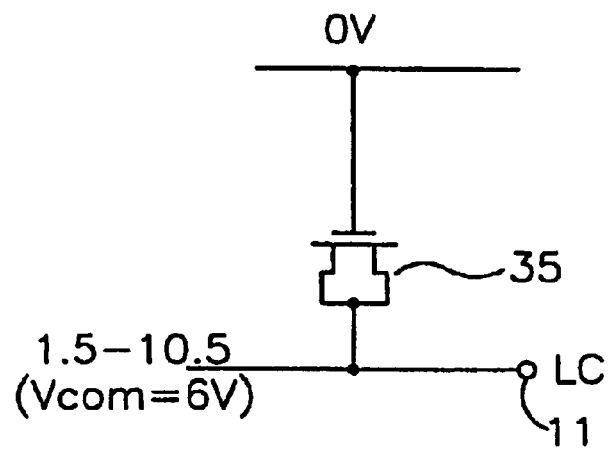

The capacitance of a MOS structure changes depending on the voltage applied to the common electrode. FIG. 17 illustrates the terminal voltages of the MOS capacitor 35 for two conditions. In the upper diagram of FIG. 17, the common electrode is at 15 volts, which is a typical supply voltage for an active matrix device. The pixel electrode 11 can have any value between 1.5 volts and 10.5 volts in a typical device. In order for the capacitor to be in its high capacitance regime, the MOS threshold voltage must be less than 4.5 volts, which is generally the case for amorphous and poly-silicon pixel TFTs.

In the configuration illustrated at the lower diagram of FIG. 17, the common electrode is at zero volts. In order for the capacitor to be in its low capacitance regime, the MOS threshold voltage must be greater than −1.5 volts, which is generally the case for amorphous and poly-silicon pixel TFTs. Thus, by switching the common electrode voltage itself, it is possible to change between the two MOS capacitor regimen to select the two different storage capacitances.

Figure 18:
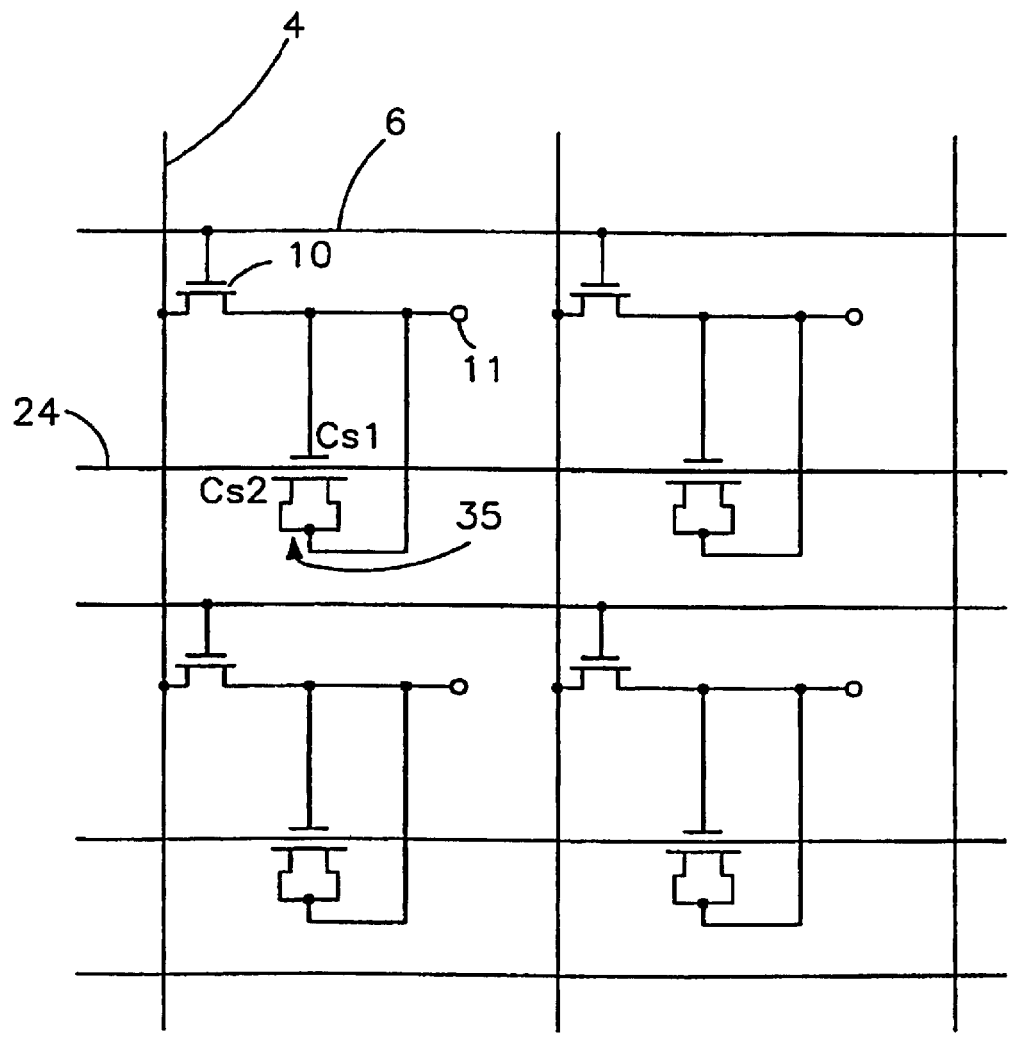
FIG. 18 is a circuit diagram of four pixels of a device constituting an eighth embodiment of the invention.
Figure 19:
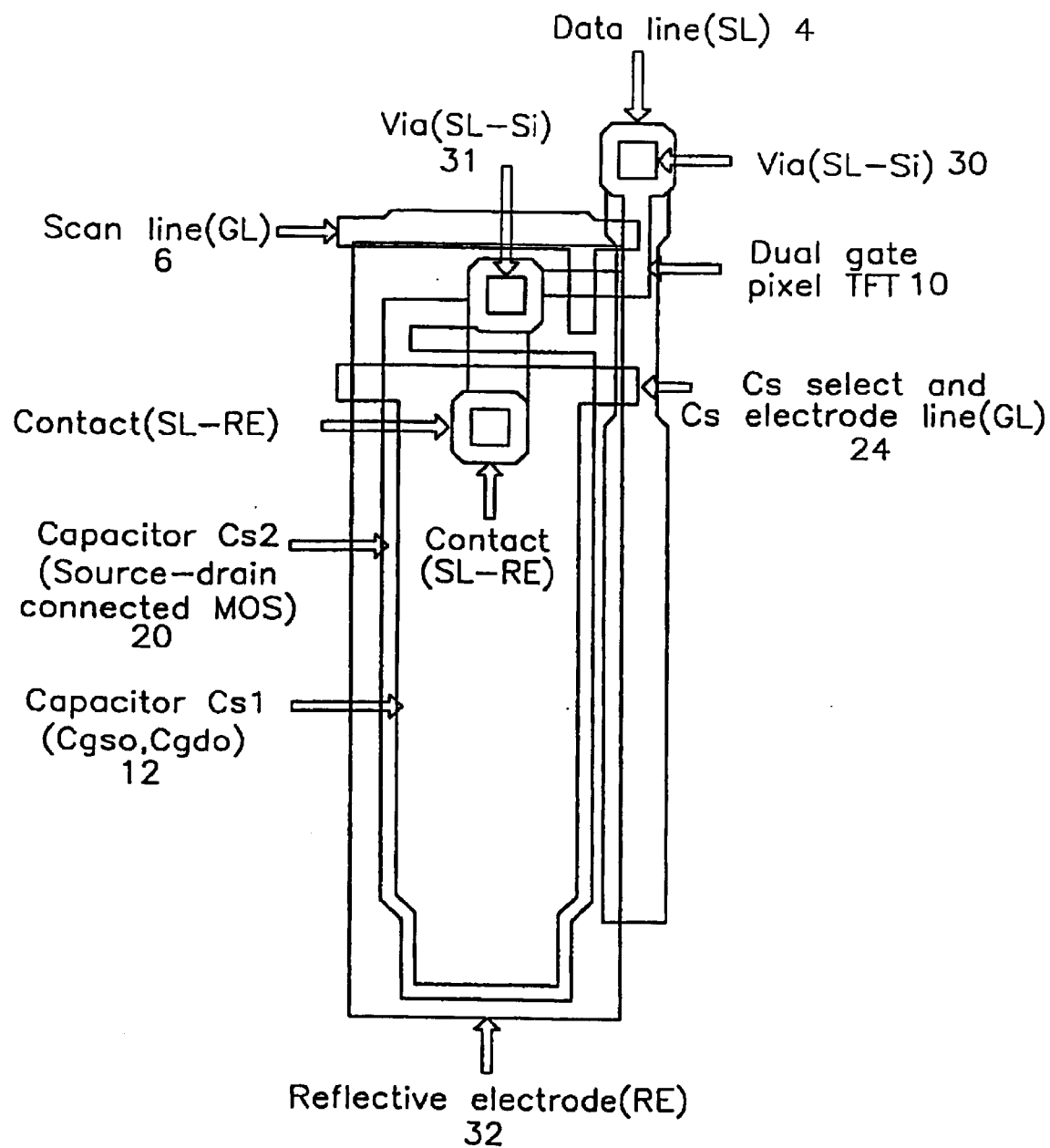
FIG. 19 shows an example of a mask layout of a pixel as shown in FIG. 18.

The device shown in FIG. 18 makes use of this capability and differs from that shown in FIG. 15 in that the TFT 20 is omitted because the capacitance switching is performed by the MOS structure 35. The mask layout for one pixel of this device is illustrated in FIG. 19.

Figure 20:
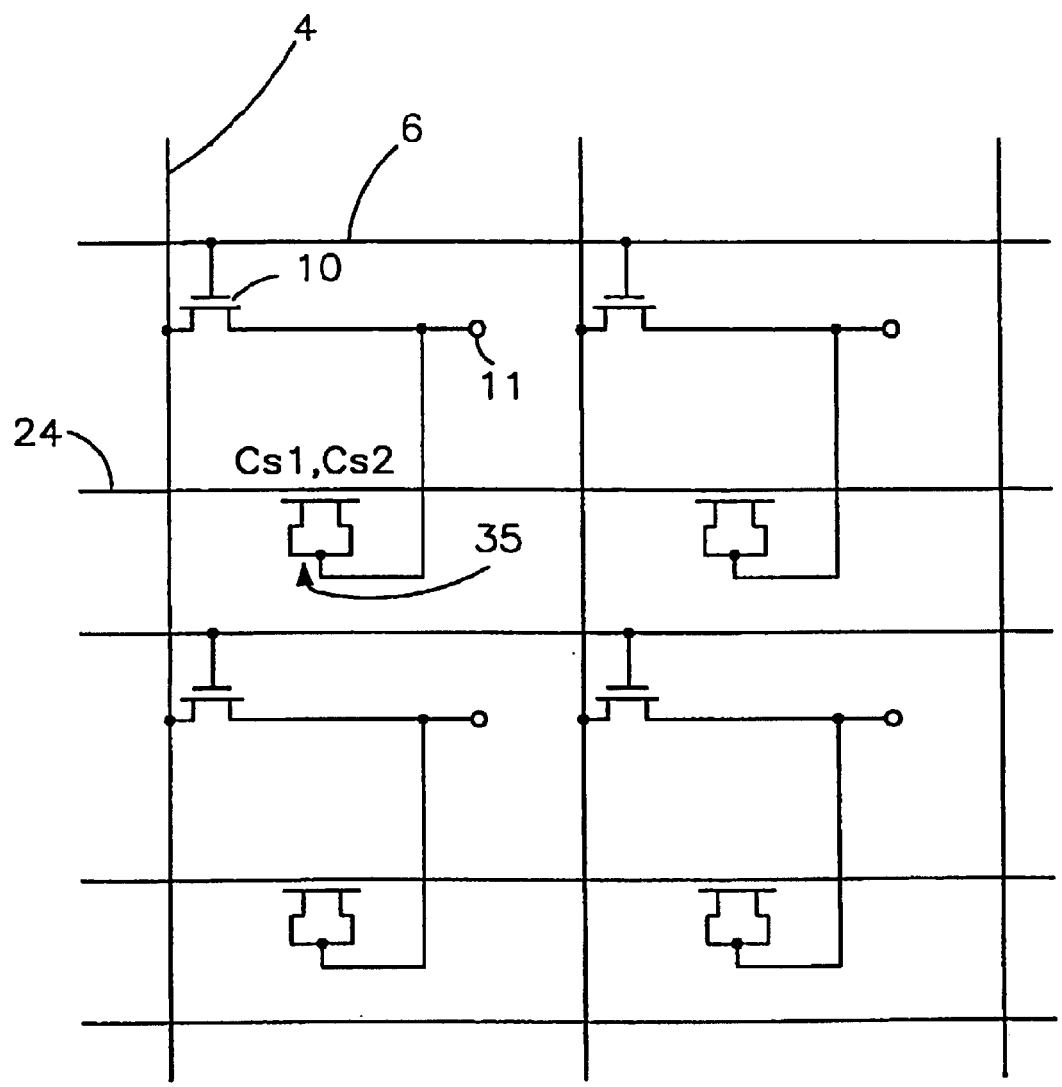
FIG. 20 is a circuit diagram of four pixels of a device constituting a ninth embodiment of the invention.

The device illustrated in FIG. 20 differs from that illustrated in FIG. 18 in that the parallel plate capacitor formed by the interconnect layers is omitted. There is therefore no need for an electrode formed on the interconnect layer SL and this results in a very simple pixel circuit. The permanently connected storage capacitor is provided by the overlap capacitances whereas the self-switching capacitor is generated by the oxide capacitance and is only switched into circuit when the line 24 is switched to a high voltage, such as Vdd. The value Cs1 of the permanently connected storage capacitor can be chosen using known TFT channel engineering techniques, such an incorporating a lightly doped drain (LDD) under the gate electrode.

What is claimed is:

1. An active matrix device comprising an array of picture elements, each of which comprises an image element, a first charge storage element connected to the image element, and a first semiconductor switch for connecting a data line to the first charge storage element and the image element, characterised in that each picture element comprises a second charge storage element and a second semiconductor switch switchable independently of the first switch to connect the second charge storage element to the first charge storage element and the image element so as to increase the charge storage capacity.

2. A device as claimed in claim 1, characterised in that each image element is a light modulating element.

3. A device as claimed in claim 2, characterised in that each image element is transmissive.

4. A device as claimed in claim 2, characterised in that each image element is reflective.

5. A device as claimed in claim 2, characterised in that each image element is a liquid crystal element.

6. A device as claimed in claim 1, characterised in that each image element is a light emitting element.

7. A device as claimed in claim 1, characterised in that each of the first and second switches is a thin film transistor.

8. A device as claimed in claim 1, characterised in that the charge storage capacity of the second charge storage element is greater than that of the first charge storage element.

9. A device as claimed in claim 1, characterised in that, for each picture element, the second charge storage element and the second switch are connected in series and the series connection of the second charge storage element and the second switch is in parallel with the first charge storage element.

10. A device as claimed in claim 1, characterised in that the picture elements are arranged as rows and columns with the picture elements of each column being connected to a respective data line and the picture elements of each row being connected to a respective scan line.

11. A device as claimed in claim 10, characterised in that the second switches of each row of picture elements have control terminals connected to a respective control line.

12. A device as claimed in claim 11, characterised in that the control lines are connected together.

13. A device as claimed in claim 1, characterised in that, for each picture element, the second switch has a control terminal connected to first terminals of the first and second charge storage elements.

14. A device as claimed in claim 10, characterised in that the first and second charge storage elements of each row of picture elements have first terminals connected to a respective common line.

15. A device as claimed in claim 10, characterised in that the first and second charge storage elements of each adjacent pair of rows of picture elements have first terminals connected to a respective common line.

16. A device as claimed in claim 10, characterised in that the first and second charge storage elements of each row of picture elements have first terminals connected to the scan line of an adjacent row.

17. A device as claimed in claim 1, characterised in that the first and second charge storage elements of each picture element comprise first and second capacitors, respectively.

18. A device as claimed in claim 17, characterised in that the first and second capacitors of each picture element have a common plate.

19. A device as claimed in claim 18, characterised in that the common plate comprises a part of a gate metal interconnect layer (GL).

20. A device as claimed in claim 19, characterised in that the first capacitor of each picture element has a further plate comprising part of a source metal interconnect layer (SL).

21. A device as claimed in claim 19, characterised in that the second capacitor of each picture element has a further plate comprising part of a heavily doped silicon layer.

22. A device as claimed in claim 17, characterised in that the second capacitor of each picture element has a dielectric comprising gate oxide.

23. A device as claimed in claim 22, characterised in that the second capacitor of each picture element comprises a metal oxide silicon capacitor.

24. A device as claimed in claim 23, characterised in that the metal oxide silicon capacitor forms the second switch and has source and drain terminals connected to the first switch and the image element.

25. A device as claimed in claim 23, characterised in that the first capacitor of each picture element comprises the gate/source overlap capacitance and the gate/drain overlap capacitance of the metal oxide silicon capacitor.

26. A device as claimed in claim 25, characterised in that the metal oxide silicon capacitor (35) has a lightly doped drain below the gate electrode.

27. A display characterised by comprising a device as claimed in claim 1.

* * * * *